(12) United States Patent
Alajbegovic et al.

(10) Patent No.: US 8,702,381 B2
(45) Date of Patent: Apr. 22, 2014

(54) SIMPLIFIED VARIABLE GEOMETRY TURBOCHARGER WITH VANE RINGS

(75) Inventors: Vahidin Alajbegovic, Arden, NC (US); Gordon Jenks, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 375 days.

(21) Appl. No.: 13/132,440

(22) PCT Filed: Dec. 4, 2009

(86) PCT No.: PCT/US2009/066680
§ 371 (c)(1),
(2), (4) Date: Jun. 2, 2011

(87) PCT Pub. No.: WO2010/068557
PCT Pub. Date: Jun. 17, 2010

(65) Prior Publication Data
US 2011/0243721 A1  Oct. 6, 2011

Related U.S. Application Data

(60) Provisional application No. 61/121,707, filed on Dec. 11, 2008.

(51) Int. Cl.
*F01D 17/16* (2006.01)
(52) U.S. Cl.
USPC ............................. 415/162; 415/164; 415/166

(58) Field of Classification Search
USPC .................... 415/159–164, 165, 166; 60/602
See application file for complete search history.

(56) References Cited

U.S. PATENT DOCUMENTS

| | | | | |
|---|---|---|---|---|
| 3,162,421 A | * | 12/1964 | Schwarz | 415/166 |
| 3,232,581 A | * | 2/1966 | Swearingen | 415/164 |
| 4,927,325 A | | 5/1990 | Yano | |
| 5,372,485 A | | 12/1994 | Sumser et al. | |
| 5,454,225 A | | 10/1995 | Sumser et al. | |
| 2006/0233640 A1 | * | 10/2006 | Lombard et al. | 415/159 |

FOREIGN PATENT DOCUMENTS

JP  08-121184 A  5/1996

* cited by examiner

*Primary Examiner* — Christopher Verdier
(74) *Attorney, Agent, or Firm* — Miller Canfield

(57) ABSTRACT

The flow path of exhaust gas to the turbine wheel (70) of a turbocharger is influenced by relative motion between two rings of vanes, at least one of which being provided on a vane ring. The outer ring of vanes contains a plurality of vanes (92, 122), the inner ring of vanes contains a plurality of vanes (93, 121), and the inner and outer vanes in registry forming a single generic vane shape. The aerodynamic effect of relative displacement of the outer ring of vanes to the inner ring of vanes produces a modulate-able control of exhaust flow to the turbine wheel.

11 Claims, 16 Drawing Sheets

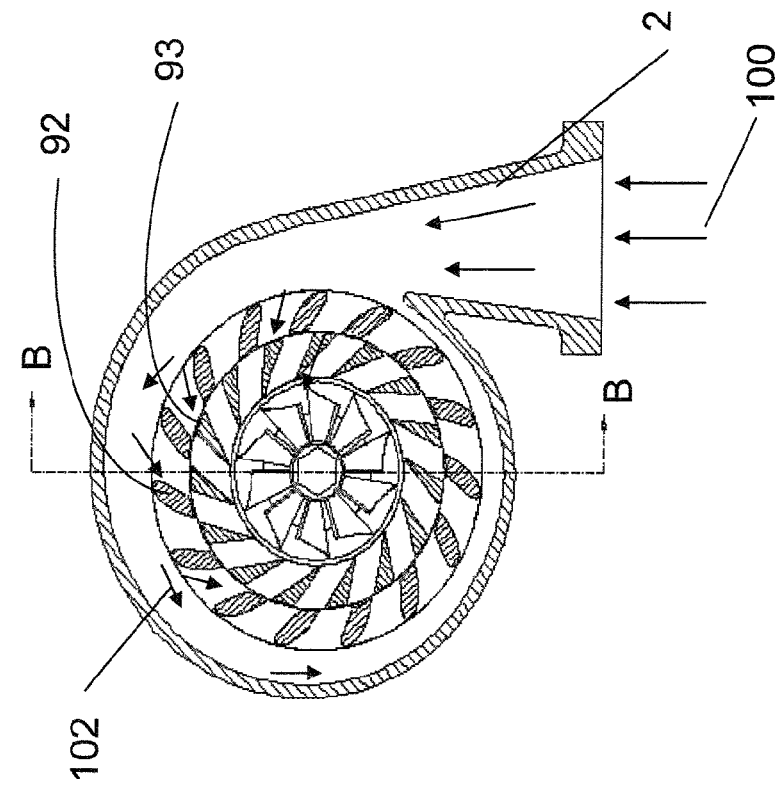
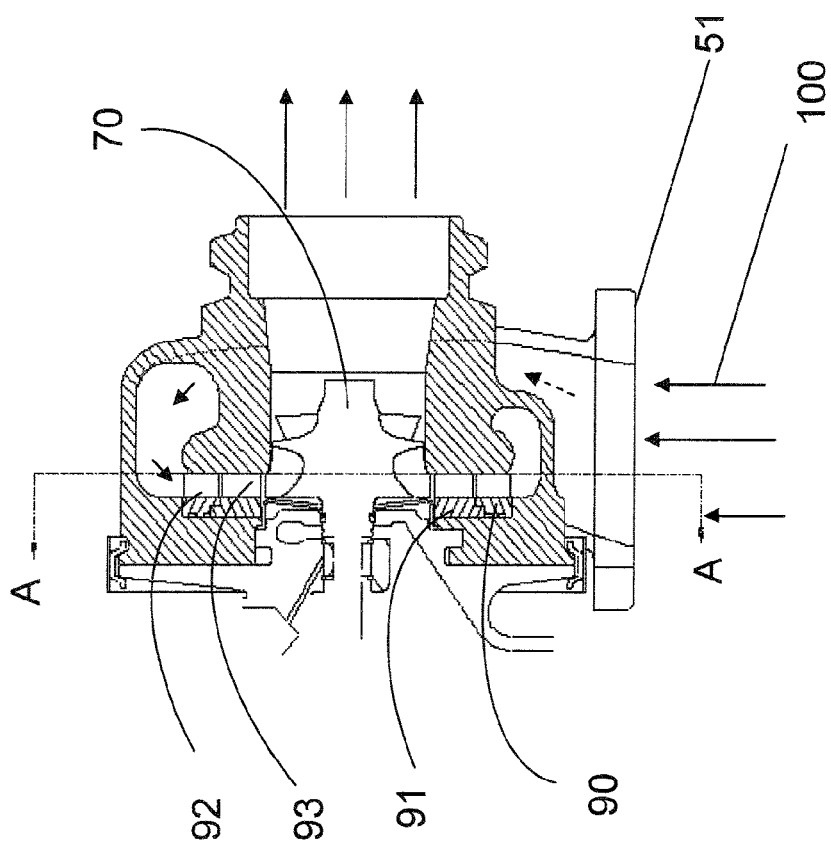
Fig. 8A
Fig. 8B

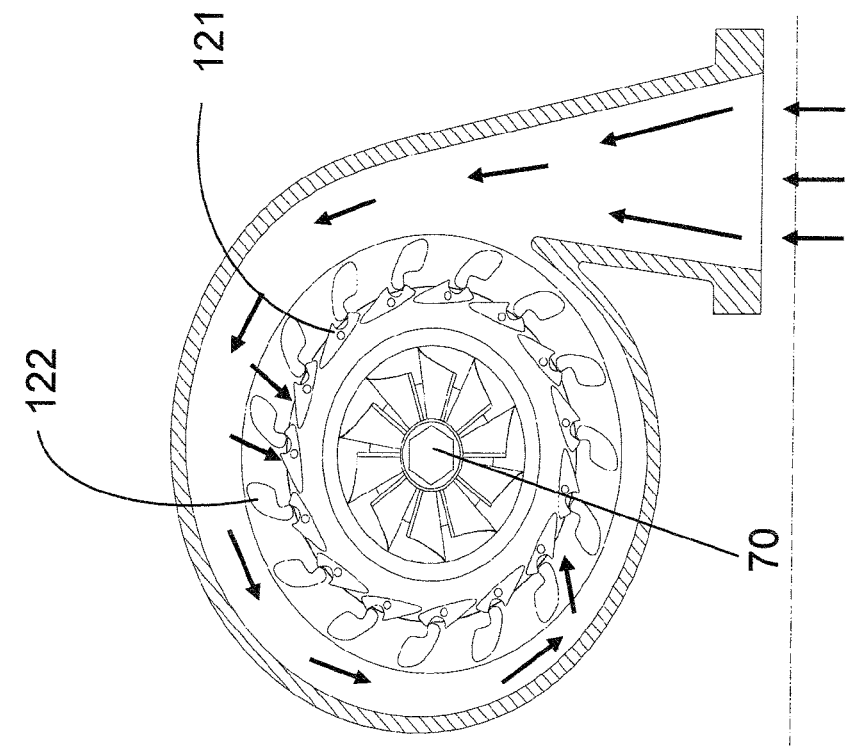
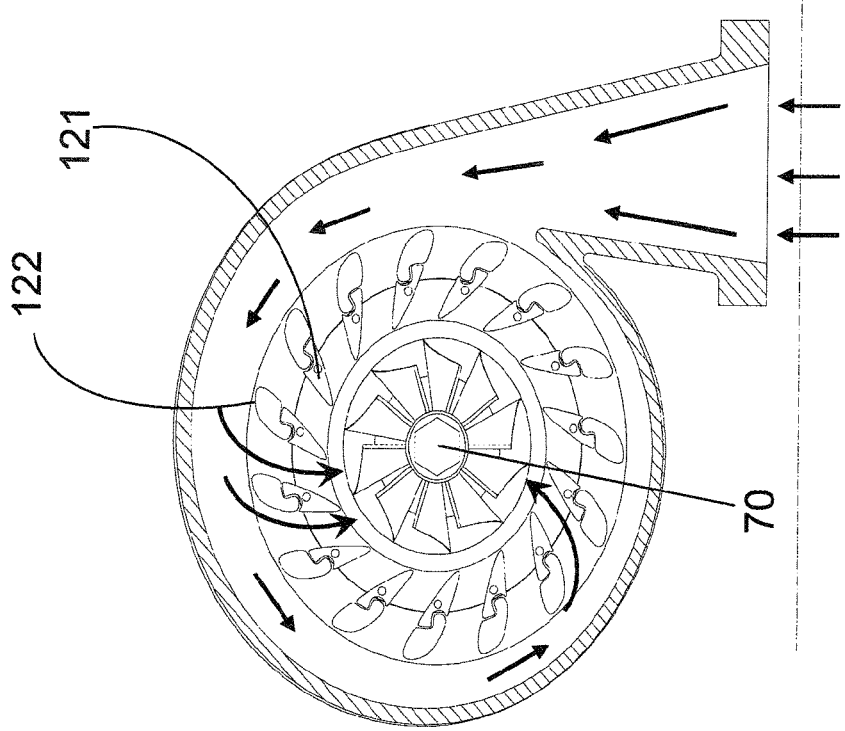
Fig. 11 A
Fig. 11 B

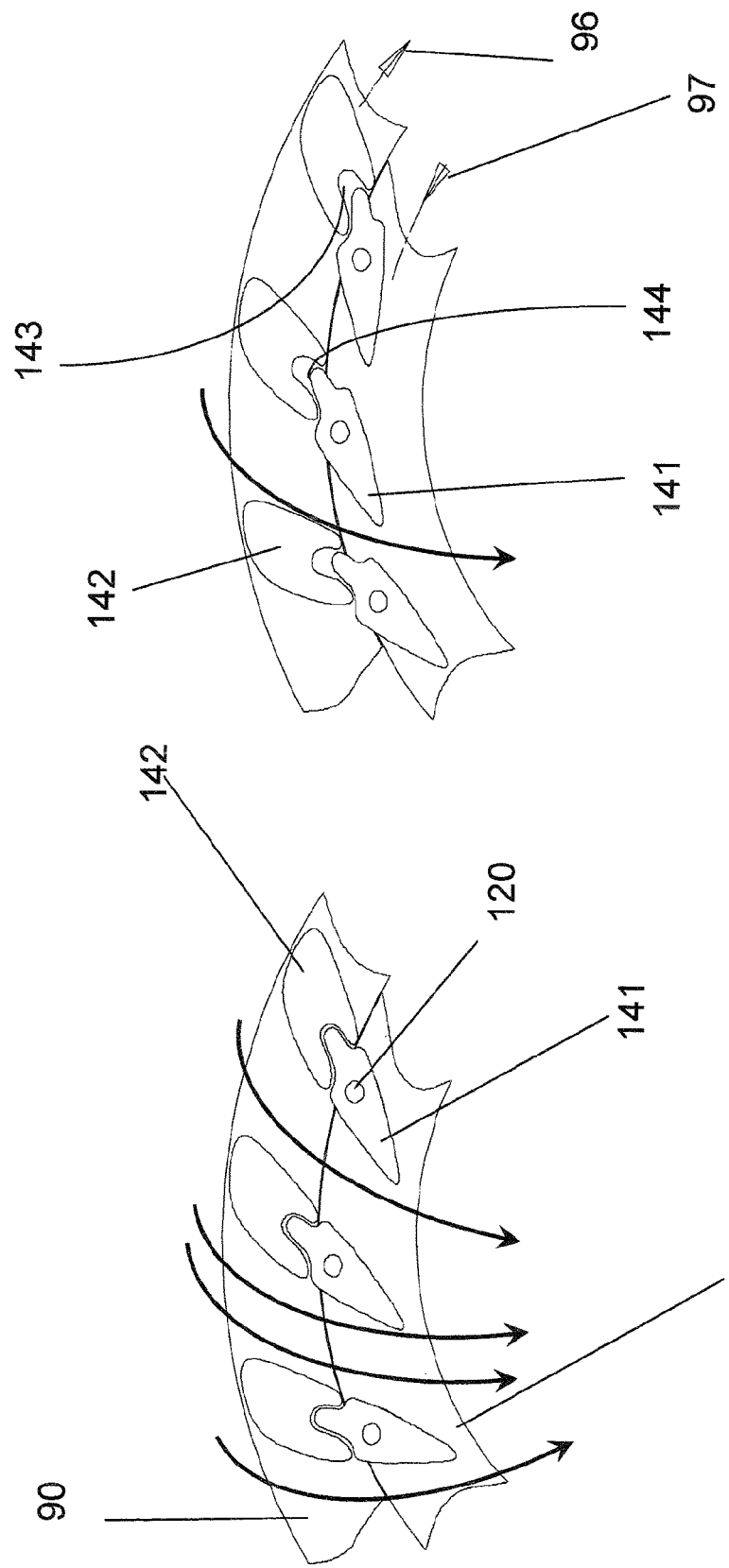

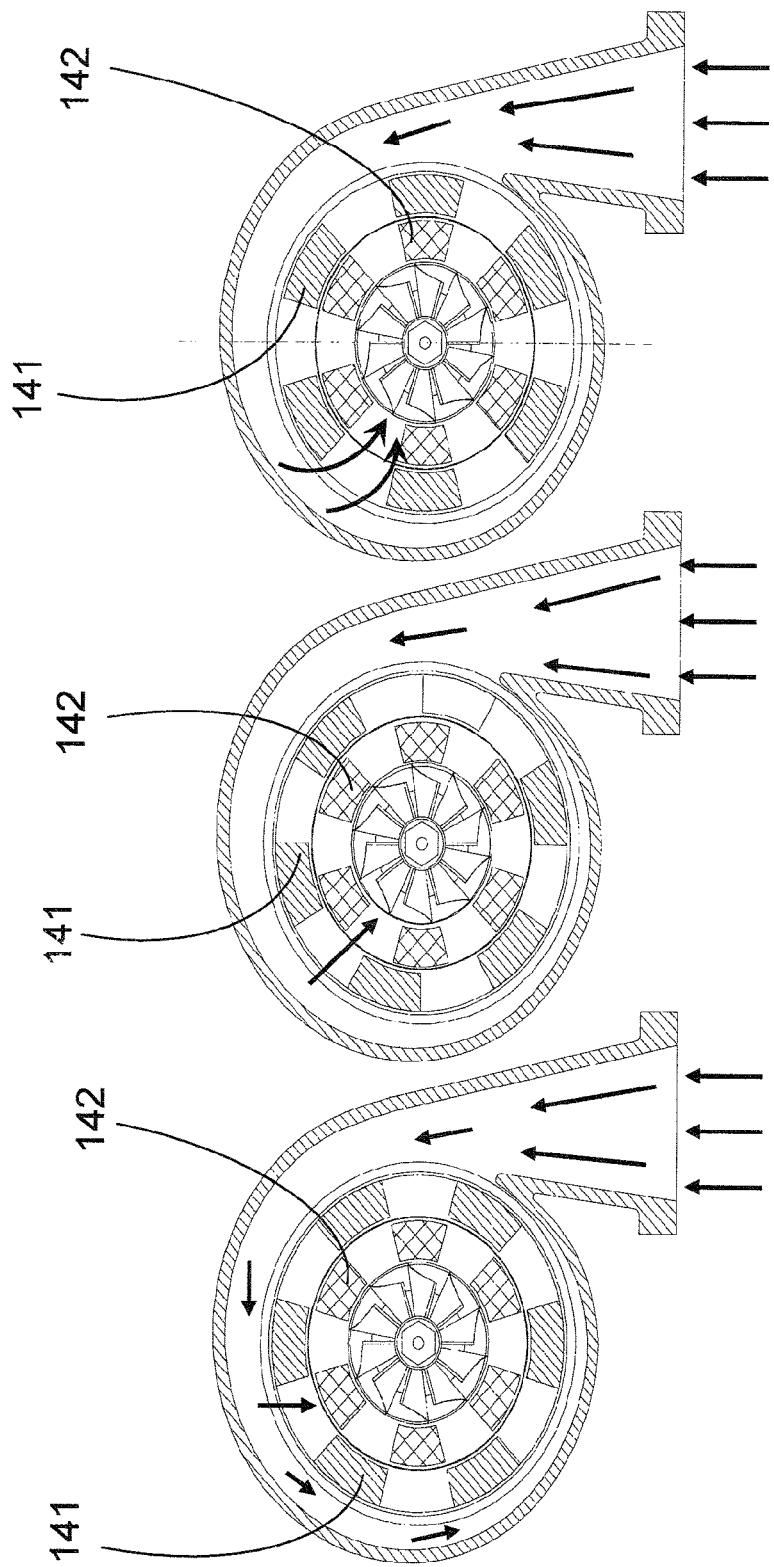

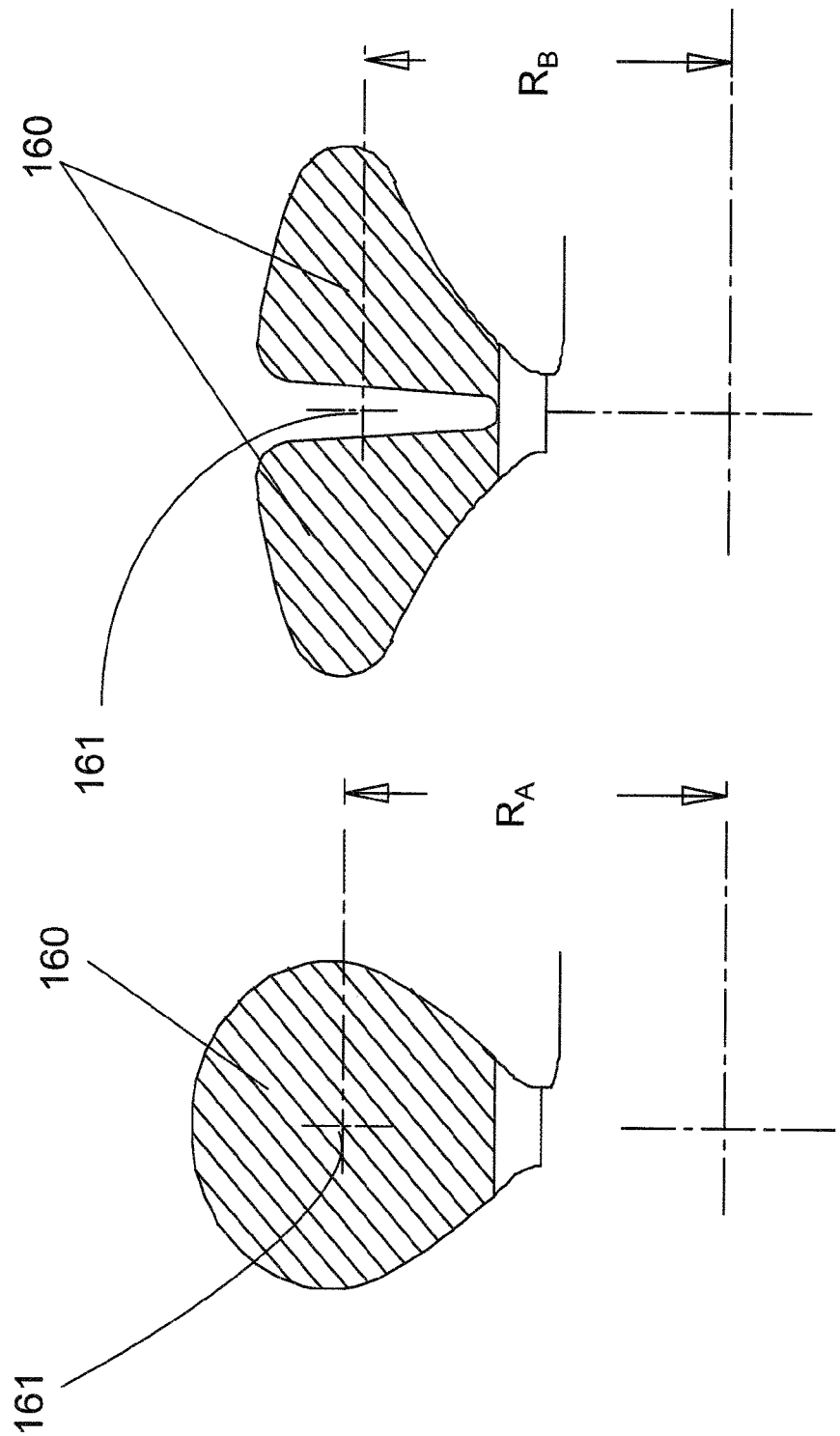

SIMPLIFIED VARIABLE GEOMETRY TURBOCHARGER WITH VANE RINGS

FIELD OF THE INVENTION

This invention is directed to the design of a low cost turbine flow control device.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers (FIG. 1) use the exhaust flow (100), which enters the turbine housing at the turbine inlet (51) of the turbine housing (2), from the engine exhaust manifold to drive a turbine wheel (70), which is located in the turbine housing. The turbine wheel is solidly affixed to a shaft, the other end of which contains a compressor wheel which is mounted to the shaft and held in position by the clamp load from a compressor nut. The primary function of the turbine wheel is providing rotational power to drive the compressor. Once the exhaust gas has passed through the turbine wheel (70) and the turbine wheel has extracted energy from the exhaust gas, the spent exhaust gas (101) exits the turbine housing (2) through the exducer (52) and is ducted to the vehicle downpipe and usually to the after-treatment devices such as catalytic converters, particulate and $NO_x$ traps.

The power developed by the turbine stage is a function of the expansion ratio across the turbine stage. That is the expansion ratio from the turbine inlet (51) to the turbine exducer (52). The range of the turbine power is a function of, among other parameters, the flow through the turbine stage.

The compressor stage consists of a wheel and its housing. Filtered air is drawn axially into the inlet (11) of the compressor cover (10) by the rotation of the compressor wheel (20). The power generated by the turbine stage to the shaft and wheel drives the compressor wheel (20) to produce a combination of static pressure with some residual kinetic energy and heat. The pressurized gas exits the compressor cover (10) through the compressor discharge (12) and is delivered, usually via an intercooler, to the engine intake.

The design of the turbine stage is a compromise among the power required to drive the compressor; the aerodynamic design of the stage; the inertia of the rotating assembly, of which the turbine is a large part since the turbine wheel is manufactured typically in Inconel which has a density 3 times that of the aluminum of the compressor wheel; the turbocharger operating cycle which affects the structural and material aspects of the design; and the near field both upstream and downstream of the turbine wheel with respect to blade excitation.

Part of the physical design of the turbine housing is a volute, the function of which is to control the inlet conditions to the turbine wheel such that the inlet flow conditions provide the most efficient transfer of power from the energy in the exhaust gas to the power developed by the turbine wheel. Theoretically the incoming exhaust flow from the engine is delivered in a uniform manner from the volute to a vortex centered on the turbine wheel axis. To do this, the cross sectional area of the volute gradually and continuously decreases until it becomes zero. The inner boundary of the volute can be a perfect circle, defined as the base circle; or, in certain cases, such as a twin volute, it can describe a spiral, of minimum diameter not less than 106% of the turbine wheel diameter. The volute is defined by the decreasing radius of the outer boundary of the volute and by the inner boundary as described above, in one plane defined in the "X-Y" axis as depicted in FIG. 4, and the cross sectional areas, at each station, in the plane passing through the "Z" axis, as depicted in FIG. 16. The "Z" axis is perpendicular to the plane defined by the "X-Y" axis and is also the axis of the turbine wheel.

The design development of the volute initiates at slice "A", which is defined as the datum for the volute. The datum is defined as the slice at an angle of "P" degrees above the "X"-axis of the turbine housing containing the "X"-axis, "Y"-axis and "Z"-axis details of the volute shape.

The size and shape of the volute is defined in the following manner: The widely used term A/R represents the ratio of the partial area at slice "A" divided by the distance from the centroid (161) of the shaded flow area (160) to the turbo centerline. In FIGS. 16A and B, the centroids (161) determine the distance $R_A$ and $R_B$ to the turbo centerline. For different members of a family of turbine housings, the general shape remains the same, but the area at slice "A" is different as is the distance $R_A$. The A/R ratio is generally used as the "name" for a specific turbine housing to differentiate that turbine housing from others in the same family (with different A/R ratios). In FIG. 16A. the volute is that of a reasonably circular shape. In FIG. 16B the volute is that of a divided turbine housing which forces the shape to be reasonably triangular. Although the areas at slice "A" for both volutes are the same, the shapes are different and the radius to the centroids are different (due to the volute shape), so the A/Rs will be different. Slice "A" is offset by angle "P" from the "X"-axis. The turbine housing is then geometrically split into equal radial slices (often 30°, thus at [30x+P]°), and the areas $(A_{A-M})$ and the radii $(R_{A-M})$ along with other geometric definitions such as corner radii are defined. From this definition, splines of points along the volute walls are generated thus defining the full shape of the volute. The wall thickness is added to the internal volute shape and through this method a turbine housing is defined.

The theoretically optimized volute shape for a given area is that of a circular cross-section since it has the minimum surface area which minimizes the fluid frictional losses. The volute, however, does not act omits own but is part of a system; so the requirements of flow in the planes from slice "A", shown in FIG. 4 to the plane at slice "M", and from "M" to the tongue, influence the performance of the turbine stage. These requirements often result in compromises such as architectural requirements outside of the turbine housing, method of location and mounting of the turbine housing to the bearing housing, and the transition from slice "A" to the turbine foot (51) result in turbine housing volutes of rectangular or triangular section, as well as in circular, or combinations of all shapes. The rectangular shape of the volute (53) in FIG. 1, showing a section "D-K" is a result of the requirement not only to fit VTG vanes into the space such that the flow is optimized through the vanes and that the vanes can be moved and controlled by devices external to the turbine housing, but also to minimize the outline of the turbine housing so the turbocharger fits on an engine.

The turbine housing foot is usually of a standard design as it mates to exhaust manifolds of many engines. The foot can be located at any angle to, or position relative to, the "volute". The transition from the foot gas passages to the volute is executed in a manner which provides the best aerodynamic and mechanical compromise.

The roughly triangular shape of the volute in FIG. 2, taken at the same sections as those above, is the more typical volute geometry for fixed and wastegated turbine housings. The addition of the divider wall (21) is to reduce aerodynamic "cross-talk" between the volutes in an effort to maintain pulse flow, from a divided manifold, to harvest the pulse energy in the work extracted by the turbine wheel. The pressure pulses in the exhaust manifold are a function of the firing order of the engine.

Turbine housings are typically designed in families (typically up to 5 in a family) which use turbine wheels of the same diameter, or a group of wheels with close to the same diameter. They may use the same turbine foot size. For example, a family of turbine housings for a 63 mm turbine wheel may cover a range of A/Rs from 1.8 to 2.2. FIG. 5 depicts the area schedule for three volutes of a family. The largest volute is a 1.2 A/R volute, shown by the dotted line (40). The smallest volute is a 0.8 A/R volute; shown by the dashed line (41) and the mean volute, in the middle of the family, is shown by the solid line. The X-axis depicts the angle of the slice, from 30° (section "A") to 360° (the tongue); the Y-axis depicts the area of the section at the respective angle.

Some turbine wheels are specifically designed to harness this pulse energy and convert it to rotational velocity. Thus the conversion of pressure and velocity from the exhaust gas for a pulse flow turbine wheel in a divided turbine housing is greater than the conversion of pressure and velocity from a steady state exhaust flow to the turbine wheel velocity. This pulse energy is more predominant in commercial Diesel engines, which operate at around 2200 RPM, with peak torque at 1200 to 1400 RPM, than in gasoline engines which operate at much higher rotational speed, often up to 6000 RPM, with peak torque at 4000 RPM so the pulse is not as well defined.

The basic turbocharger configuration is that of a fixed turbine housing. In this configuration the shape and volume of the turbine housing volute (53) is determined at the design stage and cast in place.

The next level of sophistication is that of a wastegated turbine housing. In this configuration the volute is cast in place, as in the fixed configuration above. In FIG. 2, the wastegated turbine housing features a port (54) which fluidly connects the turbine housing volute (53) to the turbine housing exducer (52). Since the port on the volute side is upstream of the turbine wheel (70), and the other side of the port, on the exducer side, is downstream of the turbine wheel, flow through the duct connecting these ports bypasses the turbine wheel (70), thus not contributing to the power delivered to the turbine wheel.

The wastegate in its most simple form is a valve (55), which can be a poppet valve. It can be a swing type valve similar to the valve in FIG. 2. Typically these valves are operated by a "dumb" actuator which senses boost pressure or vacuum to activate a diaphragm, connected to the valve, and operates without specific communication to the engine ECU. The function of the wastegate valve, in this manner, is to cut the top off the full load boost curve, thus limiting the boost level to the engine. The wastegate configuration has no effect on the characteristics of the boost curve until the valve opens. More sophisticated wastegate valves may sense barometric pressure or have electronic over-ride or control, but they all have no effect on the boost curve until they actuate to open or close the valve.

FIGS. 6A and 6B represent compressor maps. The "Y" axis (61) represents the boost or pressure ratio level and the "X" axis (60) represents the expansion ratio. FIG. 6A depicts the boost curve (67) for a fixed turbine housing. In this configuration as the turbo speed rises the upper part (65) of the boost curve continues to increase in pressure ratio as the mass flow through the wheel continues to increase. FIG. 6B depicts the boost curve (68) for a wastegated turbine housing of the same A/R as that for FIG. 6A, or a wastegated turbine housing in which the wastegate valve did not open. In FIG. 6B it can be seen that the lower shape of the boost curve (68) is exactly the same as the lower part boost curve (67) in FIG. 6A to the point (66) at which the valve opens. After this point, the boost curve (62) is relatively flat, so as the turbo speed increases the boost curve is controlled at a max. level while the massflow through the wheel continues to increase. While a wastegate can be used to limit boost levels, its turbine power control characteristics are rudimentary and coarse.

A positive byproduct of wastegated turbine housings is the opportunity to reduce the A/R of the turbine housings. Since the upper limit of the boost is controlled by the wastegate, a reduction in A/R can provide better transient response characteristics. If the wastegated turbocharger has a "dumb" actuator, which operates on a pressure or vacuum signal only, and is operated at altitude, then the critical pressure ratio at which the valve opens is detrimentally effected. Since the diaphragm in the actuator senses boost pressure on one side, and barometric pressure on the other, the tendency is for the actuator to open later (since the barometric pressure at altitude is lower than that at sea level) resulting in over-boost of the engine.

Engine boost requirements are the predominant drivers of compressor stage selection. The selection and design of the compressor is a compromise between the boost pressure requirement of the engine; the mass flow required by the engine; the efficiency required by the application; the map width required by the engine and application; the altitude and duty cycle to which the engine is to be subjected; the cylinder pressure limits of the engine; etc.

The reason this is important to turbocharger operation is that the addition of a wastegate to the turbine stage allows matching to the low speed range with a smaller turbine wheel and housing. Thus the addition of a wastegate brings with it the option for a reduction in inertia. Since a reduction in inertia of the rotating assembly typically results in a reduction of particulate matter (PM), wastegates have become common in on-highway vehicles. The problem is that most wastegates are somewhat binary in their operation, which does not fit well with the linear relationship between engine output and engine speed.

The next level of sophistication in boost control of turbochargers is the VTG (the general term for variable turbine geometry). Some of these turbochargers have rotating vanes; some have sliding sections or rings. Some titles for these devices are: Variable turbine geometry (VTG), Variable geometry turbine (VGT), variable nozzle turbine (VNT), or simply variable geometry (VG).

VTG turbochargers utilize adjustable guide vanes FIGS. 3A and 3B, rotatably connected to a pair of vane rings and/or the nozzle wall. These vanes are adjusted to control the exhaust gas backpressure and the turbocharger speed by modulating the exhaust gas flow to the turbine wheel. In FIG. 3A the vanes (31) are in the minimum open position. In FIG. 3B the vanes (31) are in the maximum open position. The vanes can be rotatably driven by fingers engaged in a unison ring, which can be located above the upper vane ring. For the sake of clarity, these details have been omitted from the drawings. VTG turbochargers have a large number of very expensive alloy components which must be assembled and positioned in the turbine housing so that the guide vanes remain properly positioned with respect to the exhaust supply flow channel and the turbine wheel over the range of thermal operating conditions to which they are exposed. The temperature and corrosive conditions force the use of exotic alloys in all internal components. These are very expensive to procure, machine, and weld (where required). Since the VTG design can change turbocharger speed very quickly, extensive software and controls are a necessity to prevent unwanted speed excursions. This translates to expensive actuators. While VTGs of various types and configurations have been adopted widely to control both turbocharger boost levels and turbine backpressure levels, the cost of the hardware and the cost of implementation are high.

In order to keep flow attached to the volute walls and to keep the shape of the volute appropriate to the function of the volute, an A/R schedule is plotted, as in FIG. 5, to ensure that there exist no inappropriate changes in section. In FIG. 5, the "X" axis is the angle for each section. The angles could be substituted by the defining letters "A" though "M" as used in FIG. 4. The "Y" axis depicts the radius of the section. The dotted line (40) is the area schedule for the largest A/R of the family. The dashed line (41) is the area schedule for the smallest A/R of the family.

If one considers a wastegated turbo as a baseline for cost, then the cost of a typical TVG, in the same production volume is from 270% to 300% the cost of the same size fixed, turbocharger. This disparity is due to a number of pertinent factors from the number of components, the materials of the components, the accuracy required in the manufacture and machining of the components, to the speed, accuracy, and repeatability of the actuator. The chart in FIG. 7 shows the comparative cost for the range of turbochargers from fixed to VTGs.

Thus it can be seen that for both technical reasons and cost drivers that there needs to be a relatively low cost turbine flow control device which fits between wastegates and VTGs in terms of cost. The target cost price for such a device needs to be in the range of 145% to 165% that of a simple, fixed turbocharger.

SUMMARY OF THE INVENTION

The present invention relates to a simplified, low cost, variable nozzle to control the exhaust gas flow to a turbine wheel in a variable flow turbocharger. Thus the boost pressure can be modulated by controlling the nozzle flow volume.

The invention produces change of turbine flow with acceptable resolution at a lower cost than that for a VTG turbocharger. By incorporating two co-axial vane rings, each with vanes, either cast in, or attached, and by moving one, or both vanes in a circumferential direction, there becomes an angular displacement which influences exhaust flow to the turbine, and thus the boost level output of the turbocharger.

BRIEF DESCRIPTION OF THE DRAWINGS

The present invention is illustrated by way of example and not limitation in the accompanying drawings in which like reference numbers indicate similar parts, and in which:

FIGS. 8A,B depict a pair of sections of the first embodiment of the invention;

FIG. 11A,B depict a pair of sections of the second embodiment of the invention;

FIGS. 14A,B depict alternatives to the second embodiment of FIG. 11;

FIGS. 15A,B,C depict the basic definition of the invention; and

FIGS. 16A,B depict the section of the volute at slice "A"

DETAILED DESCRIPTION OF THE INVENTION

Figure 1:
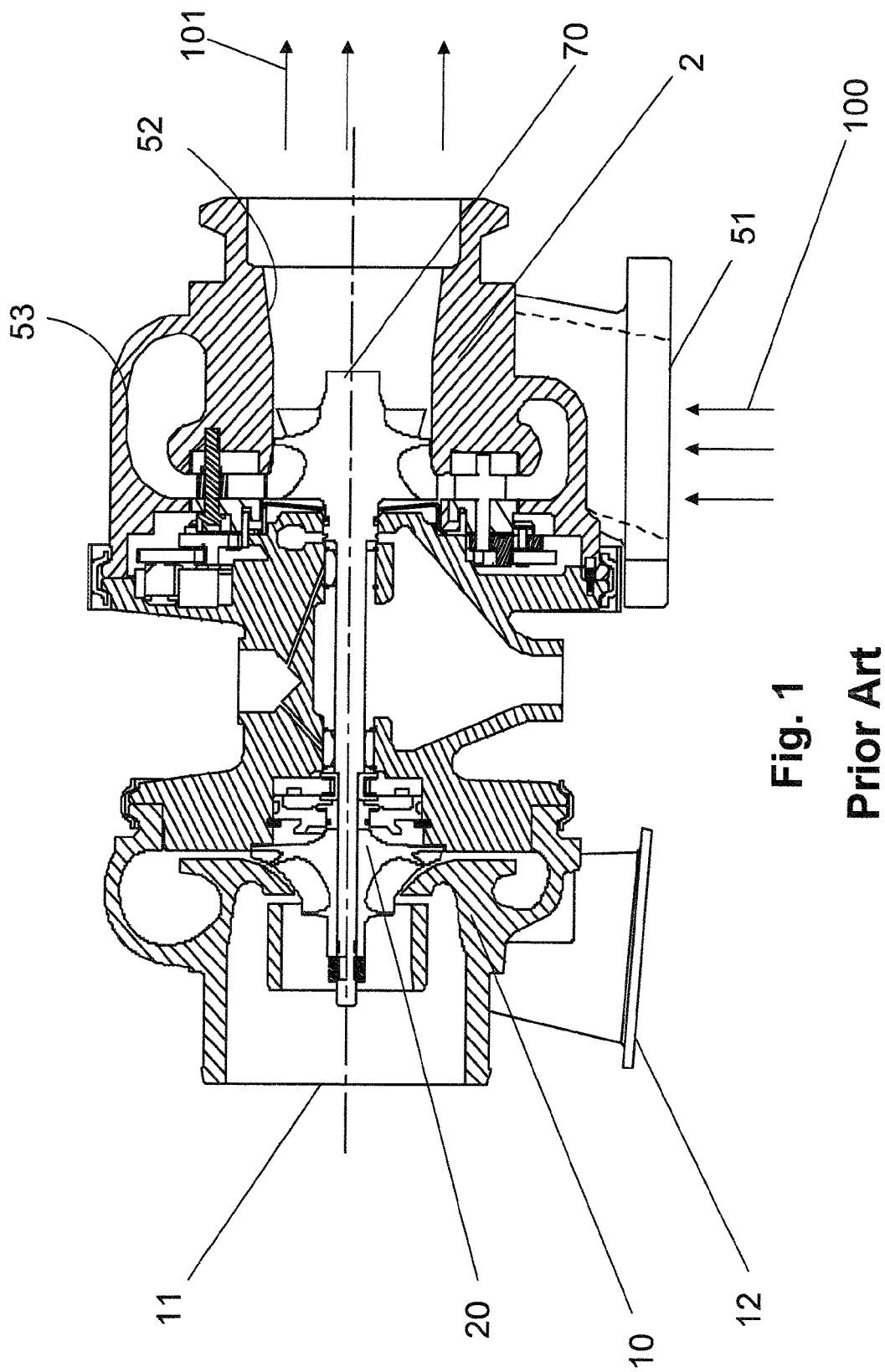
FIG. 1 depicts the section for a typical VTG turbocharger.
Figures 2A, 2B:
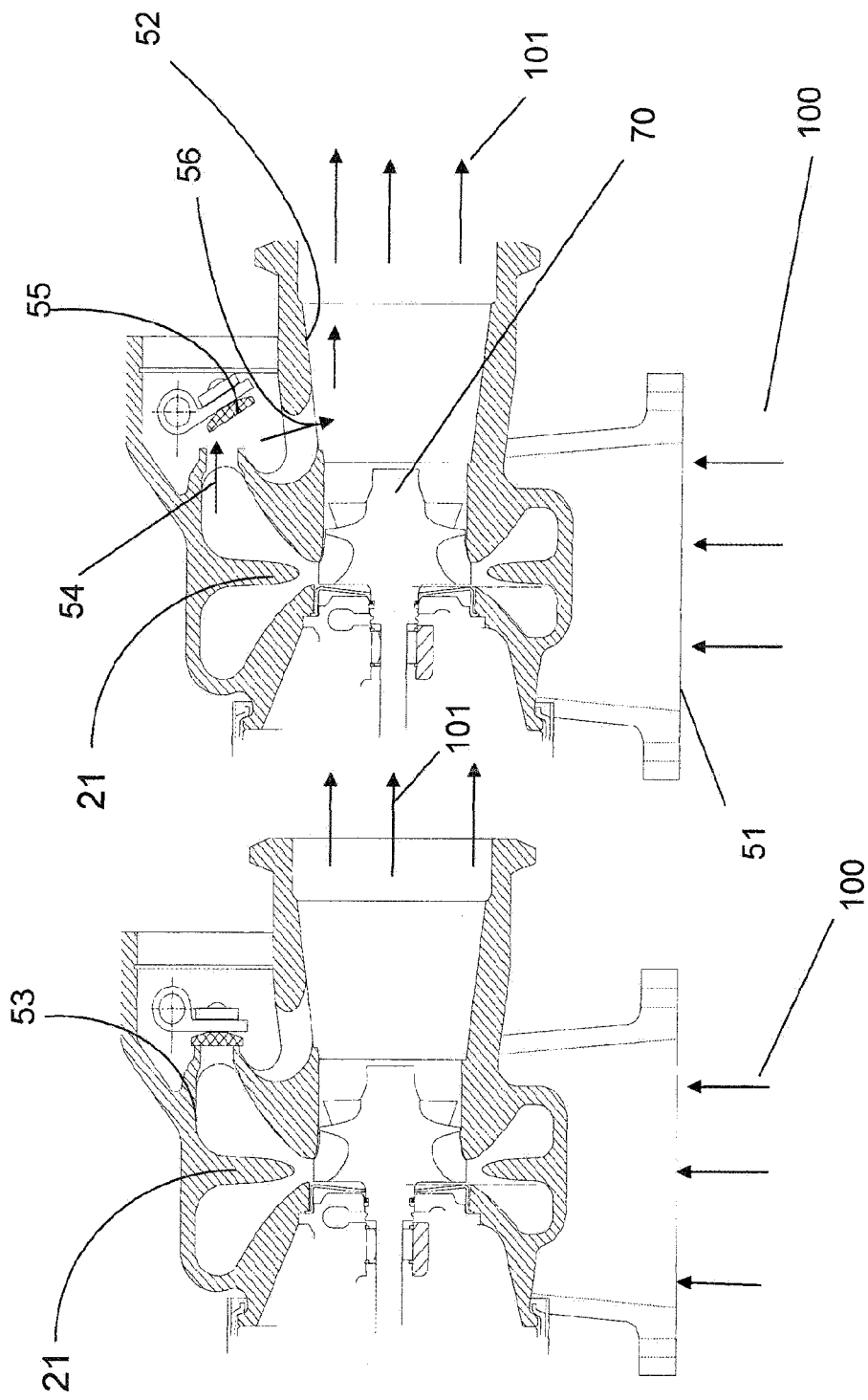
FIGS. 2A and 2B each depict a section of a typical wastegated turbocharger.
Figure 3B:
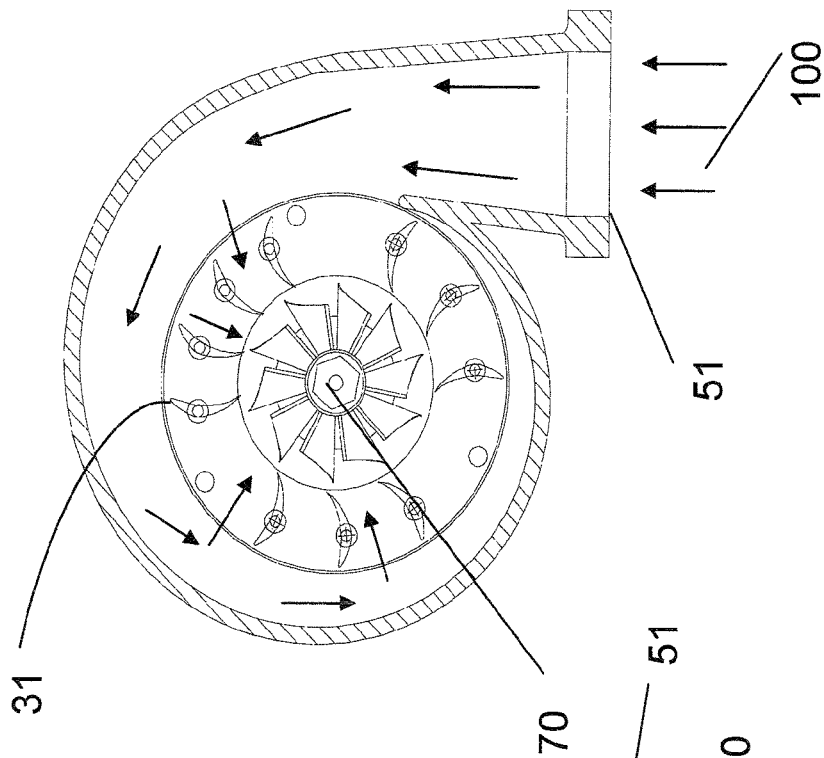
FIGS. 3A, B depict sections of a typical VTG turbocharger, with the vanes in different positions.
Figure 3A:
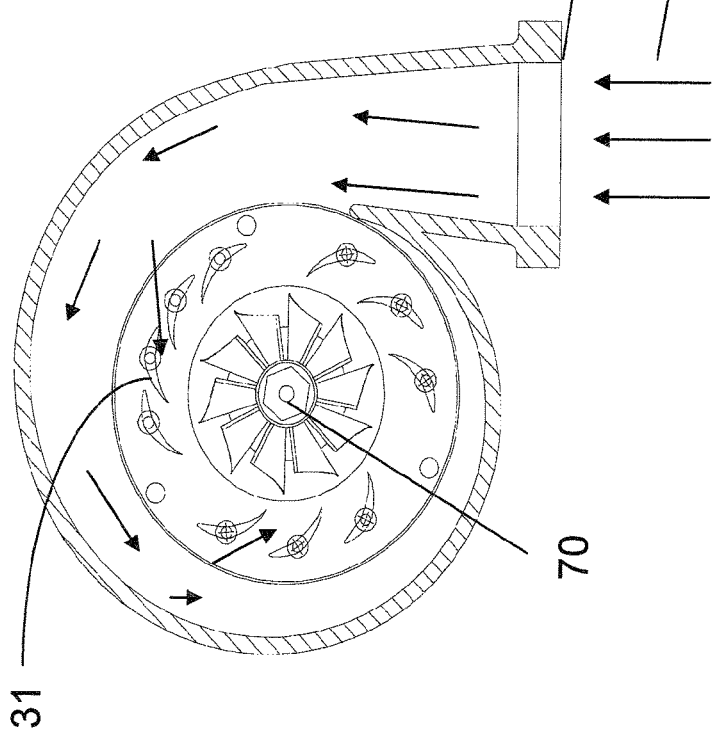
Figure 4:
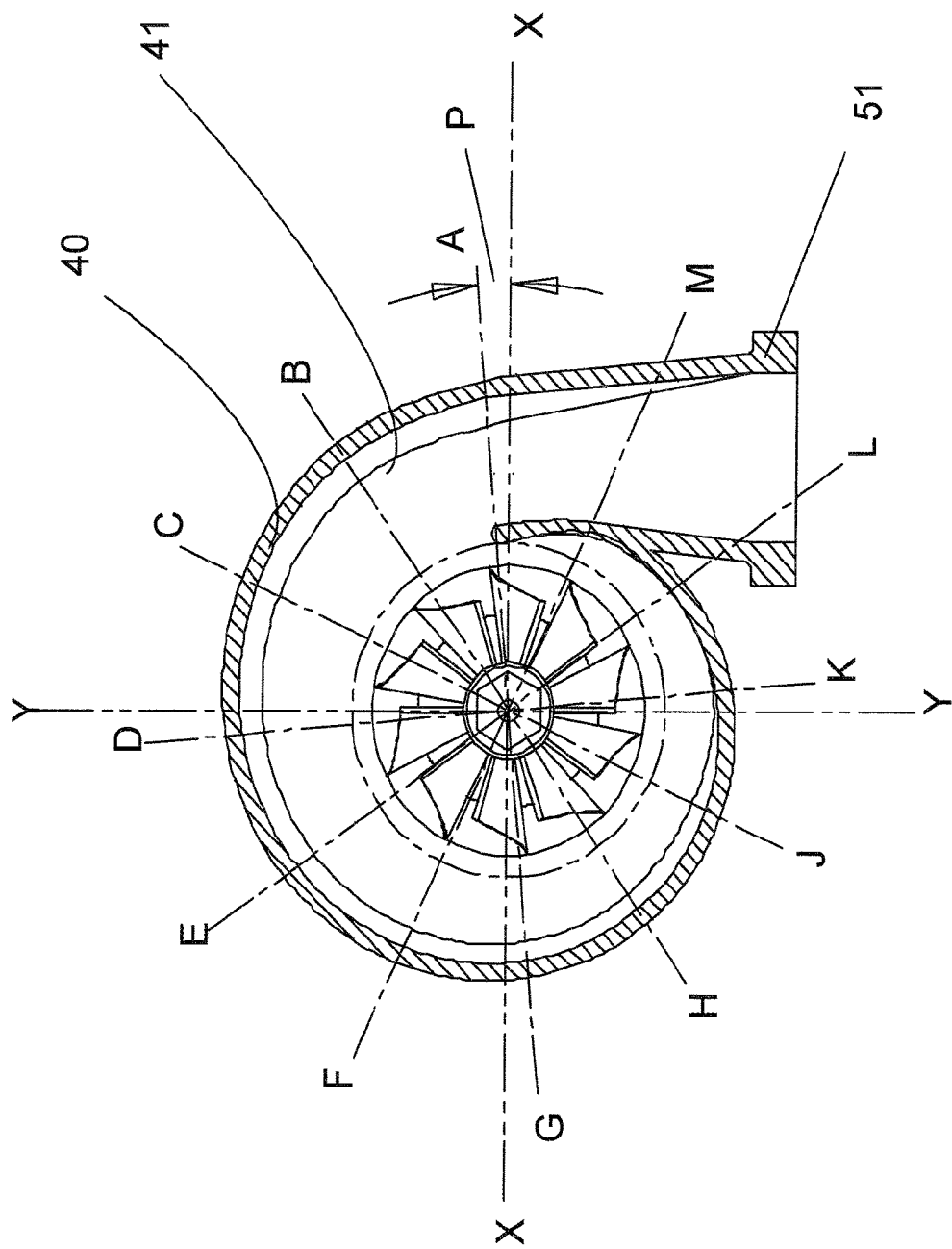
FIG. 4 depicts a section of a typical fixed turbine housing showing construction radial lines.
Figure 5:
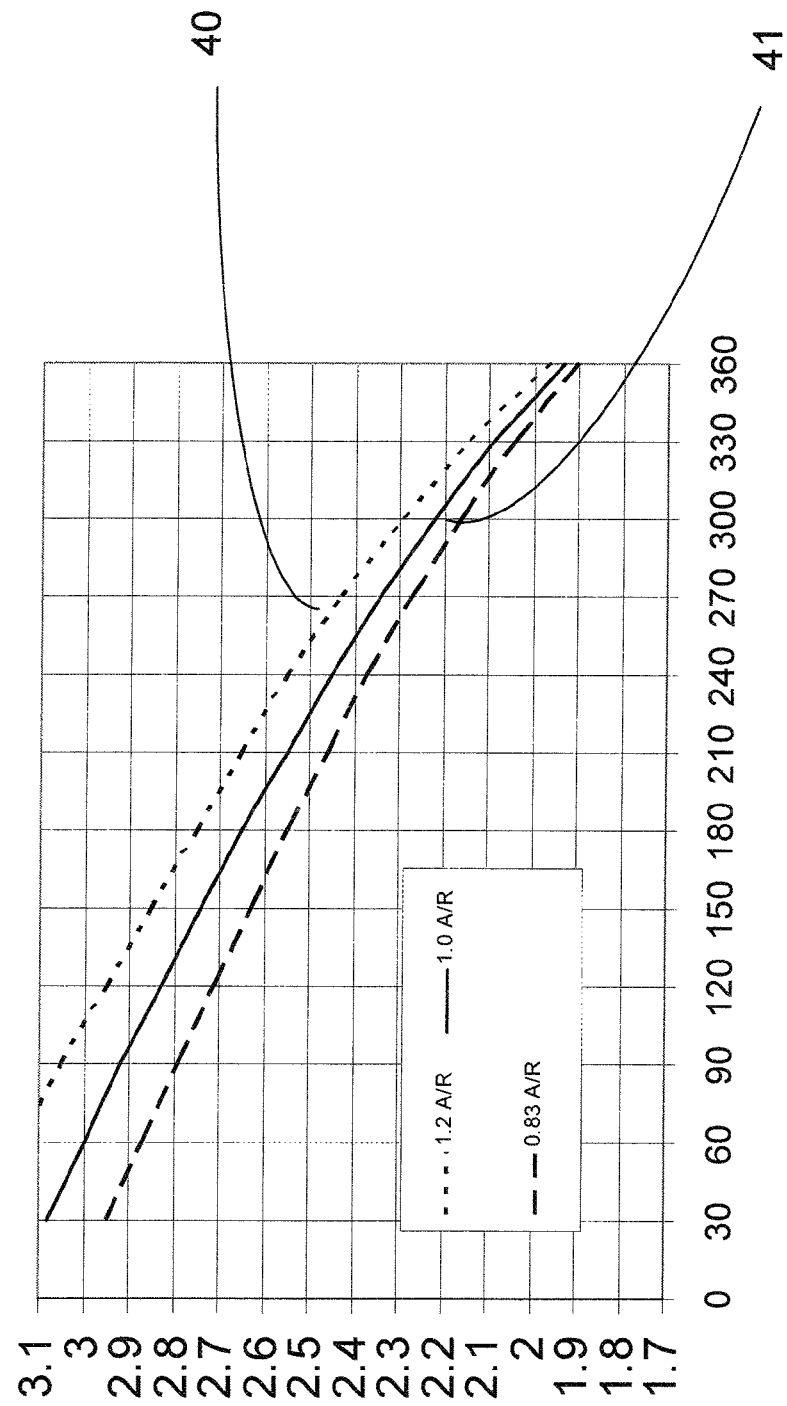
FIG. 5 is a chart of cross-sectional area development.
Figures 6A, 6B:
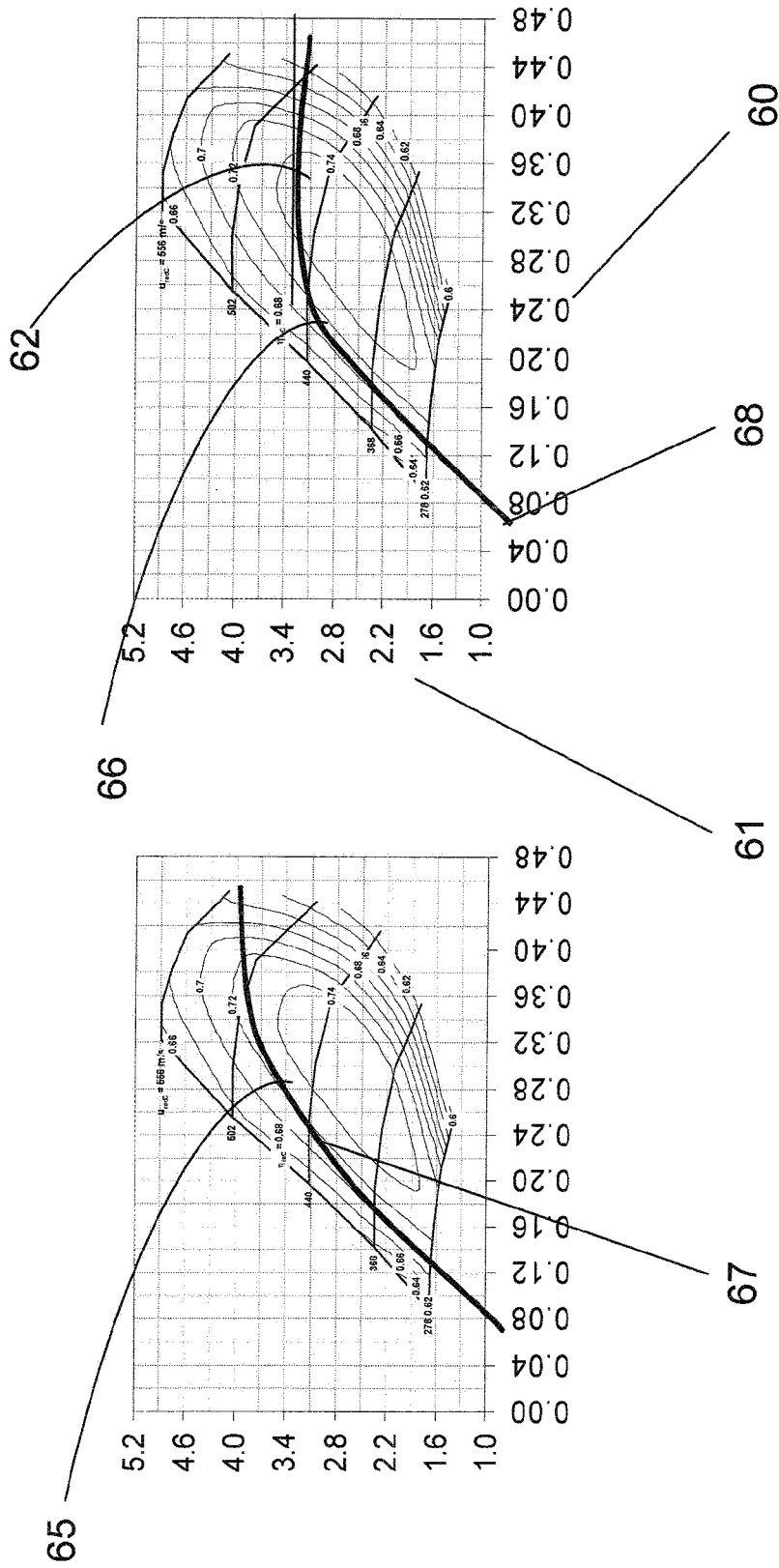
FIGS. 6A,B depict the compressor maps for a typical fixed, and a wastegated turbocharger.
Figure 7:
FIG. 7 is a chart showing turbocharger relative costs.

In each of the embodiments presented in this invention, the objective is met by a change in the relative circumferential position of one set of shapes to another co-axially arranged set of shapes. The shapes and mechanisms for changing relative position will be discussed in detail, but the crux of the invention can be seen in FIG. 15A to 15C in which the shapes contained in one box (142) are circumferentially displaced relative to the shapes contained in an annularly adjacent box (141). This circumferential motion alters the flow characteristics through the flow space between the shapes, contained within the aforementioned "boxes".

In the first embodiment, shown in FIGS. 8A, 8B, 9A and 9B, a plurality of vane shapes (92) are arranged on an outer vane ring (90) such that these vanes present a leading edge (94) of a vane shape to the incoming exhaust airflow (102), turning the airflow from the volute to a direction (103) aimed at the vortex of the turbine wheel. On an inner vane ring (91), a plurality of vane shapes (93) are arranged such that these vanes present the trailing part of the leading vane shape, arranged on the outer vane ring, to "pinch" the flow of exhaust gas and thereby further guide and influence the flow direction of the exhaust gas coming from the arrangement on the outer vane ring. One of the outer vanes (92) and one of the inner vanes (93), when in registry, form a general airfoil shape, with the outer vane (92) forming the leading edge of said general airfoil shape, and the inner vane (93) forming the trailing edge of said general airfoil shape. The inner ring of vanes and outer ring of vanes are segregated along a circular boundary line. The circular boundary line defines an arc through each of the general airfoil shapes, separating each of the outer and inner vanes.

To alter the flow of exhaust gas from the volute to the turbine wheel, the relative circumferential position of the vane rings, with respect to each other, is changed. This change can be effected by rotating the outer vane ring, with the inner vane ring stationary; by rotating the inner vane ring, with the outer vane ring stationary; or by counter-rotating both vane rings. In any of the above cases, the flow path to the turbine wheel is reduced so the flow (103), which can pass when the flowpath is at its maximum, as seen in FIG. 9A, is reduced by the relative circumferential motion (96 and 97) to allow reduced flow (104) as seen in FIG. 9B.

The design of the outer vane shape (92) on the outer vane ring (90) is such that the leading edge (94) of the outer vane is presented to the airflow (102) in the volute such that the direction of the airflow in the volute is modified to direct said airflow towards the vortex of the turbine wheel (70). The design of the trailing edge (94A) to outer vane (92) shape on the outer ring is simply that of a "whole" (outer and inner) vane shape cut off at the inner periphery of the outer vane ring. The design of the inner vane (93) shape on the inner vane ring (91) is such that it provides the trailing edge for the outer vane (92) when the vanes are aligned to make a "whole" vane, as in FIG. 9A, and is sufficiently rounded to provide an inner vane leading edge (95) for the inner vane (93) when the vane rings are circumferentially displaced as in FIG. 9B. There may be a case for a complementary vane, like a swept flap on an aeroplane wing.

In the case where one of the vane rings is stationary at all times, the shapes of the vanes could be cast into the wall of either the turbine housing or the bearing housing, since both make up the side walls of the flow passage, to dispense with the cost and complication of one of the vane rings.

Figures 9A, 9B:
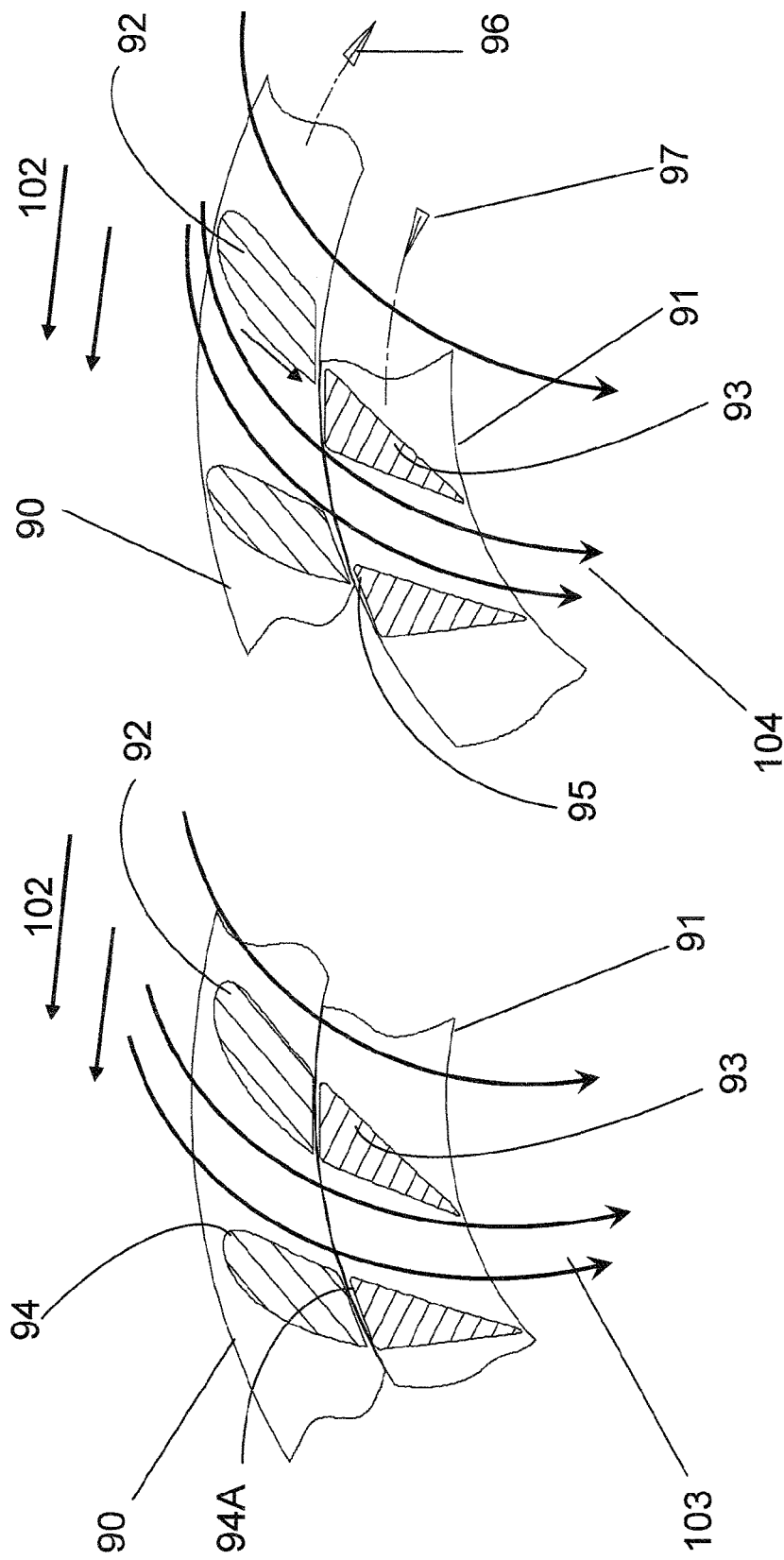
FIGS. 9A,B depict a pair of magnified sections of FIG. 8B.
Figures 10A, 10B, 10C:
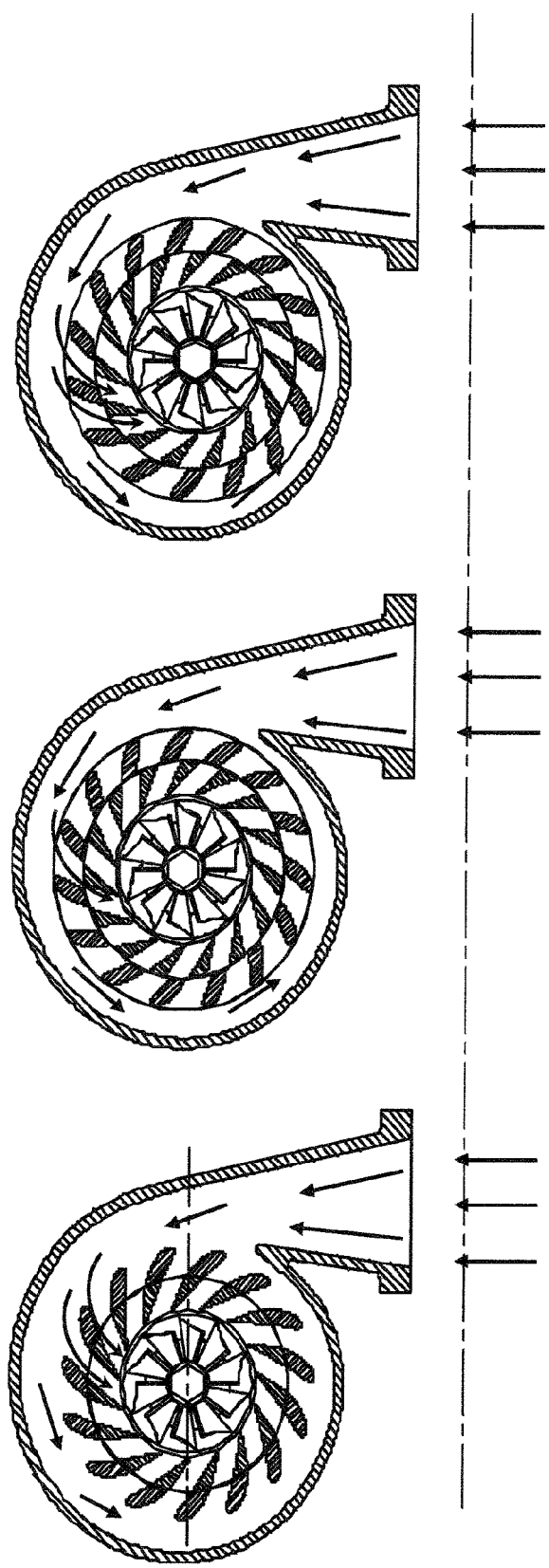
FIGS. 10A,B,C show the motion of the first embodiment over a range of vane ring displacements.

The design of the first embodiment is such that the circumferential displacement of the vane rings, as described above, can be described by any angle between the alignment of the leading vane, on the outer vane ring, and it's trailing mate, on the inner vane ring, as shown in FIG. 9A, to the alignment of the leading vane, on the outer vane ring, and the vane on the inner ring, adjacent to its trailing mate on the inner vane ring. The space between the vanes is a property of the width of the vane, the number of vanes, the alignment of the vanes to the flowpath, and the volume between vanes and walls to provide the flow required for the turbine wheel. The area between outer vanes defines nozzles through which exhaust gas flows, and the ratio of nozzle space at the circular boundary line to area blocked by the outer vane at the circular boundary line is from 3:1 to 1:1. In some embodiments, the ratio is from 2:1 to 1:1. In some embodiments, the ratio is from 1.5:1 to 1:1. In FIGS. 10, A, B, and C, the results of rotation of one vane ring relative to the other can be seen. In FIG. 10A, the vanes are positioned in line to present the maximum flow volume to the turbine wheel. In FIG. 10B, the vanes are positioned to nearly fully block the flow of exhaust gas to the turbine wheel. Testing by the Applicants showed that some flowpath is required to keep the rotor turning for reasons of cooling and oil-lubrication. In FIG. 10C the vanes are presented in such a manner that a partial flow volume exists between the vanes of the outer and inner vane rings, and the exhaust flow to the turbine wheel can be modulated.

In the second embodiment of this invention, as seen in FIGS. 11 and 12, the vanes are configured such that relative motion between the inner and outer vane rings produces not only a reduction in flow area in the space adjacent between vanes, as described in the first embodiment, but also rotation of one of the vanes driven by the combination of pivotable design of one element, circumferential displacement of the vanes, and a contact path between the vanes on the inner and outer vane rings.

The design of the vanes in the second embodiment is such that circumferential displacement of one of the vane rings, with respect to the other vane ring, or with respect to the turbine housing or bearing housing, for cases in which the vanes on the non-rotational vane ring are fabricated onto the sidewall of either the turbine housing or bearing housing. This circumferential displacement of one vane ring causes motion on the other vane ring such that a vane, mounted so that it can rotate about an axis (120) parallel to the turbocharger centerline, rotates about said axis (120) to modify the flow volume to the turbine wheel.

Figures 12A, 12B:
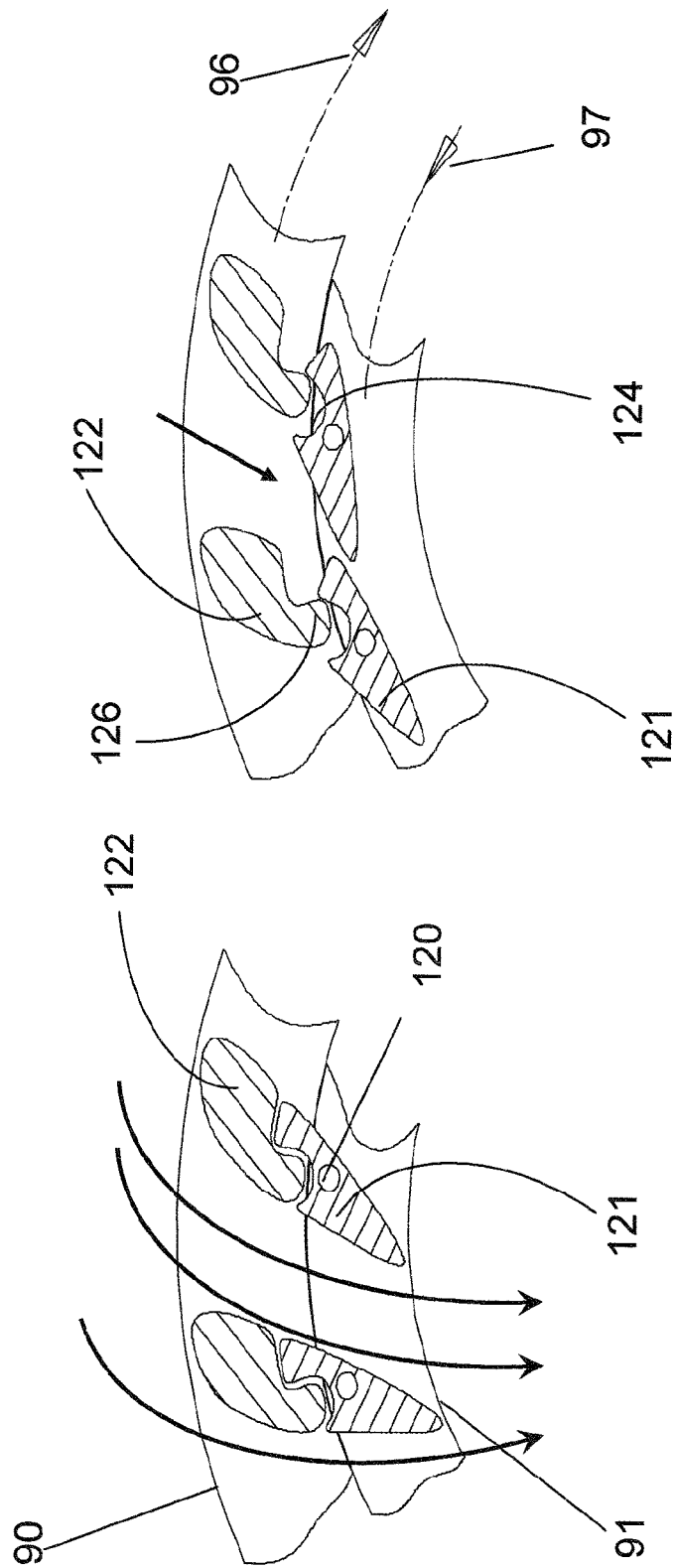
FIG. 12A,B depict a pair of magnified sections of FIGS. 11A and 11B.
Figure 13B:
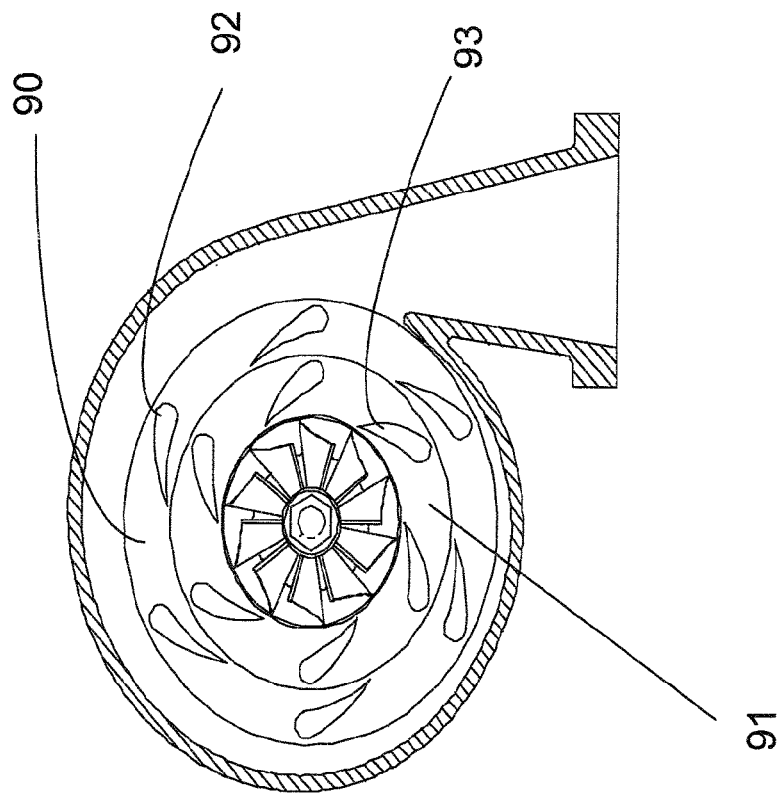
FIGS. 13A,B depict alternative vane configurations of the first embodiment, in two positions.
Figure 13A:
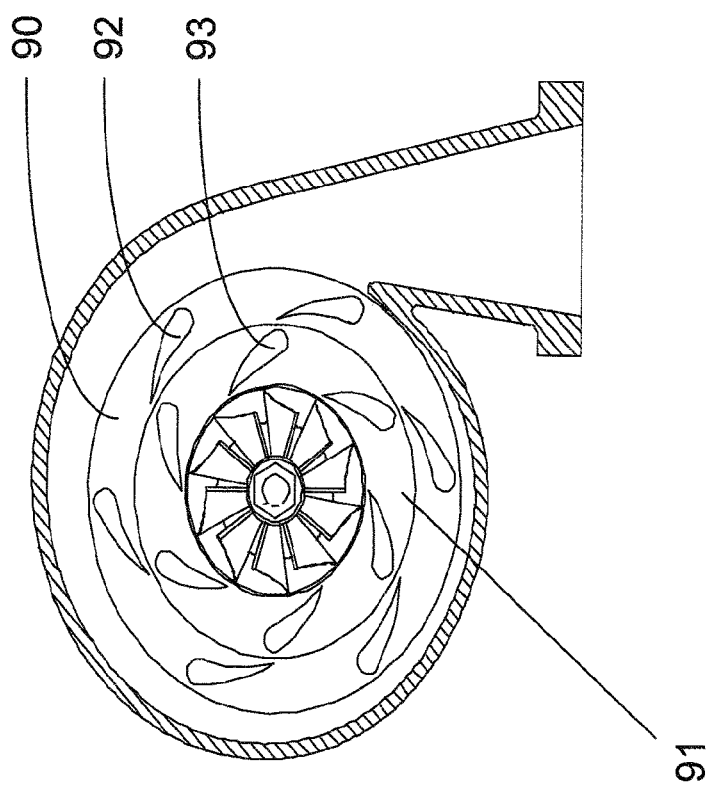

In FIG. 12A and FIG. 12B the vanes are arranged such that the outer vane ring (90) moves in a circumferential motion (96). The circumferential displacement of the outer vane (90) to the inner vane ring (91) causes the tongues (126) on the vanes (122) to rotate the vanes (121) on the lower vane ring (91) about the axes (120) so the vanes effective camber causes the vanes to block some of the flow paths to the turbine wheel. Varying effective camber allows for better optimization of the inlet angle and throat area of a particular volute design, while exit angle and exit throat area can be adjusted independently for optimal turbine performance. The exhaust flow pressure on the moving vanes (121) keeps the male tongues (126) on the outer vane in contact with the female cavities (124) in the vanes (121) on the inner vane ring (91).

When the relative motion (96 and 97) is reversed, the exhaust pressure on the tails of the rotatable vanes on the inner vane ring causes the female cavities (124) on the vanes (121) on the inner vane ring to follow the male tongues (126) on the vanes (122) on the outer vane ring until the inner and outer vanes are in alignment again, reducing the effective camber of the vanes.

In another version of the second embodiment, as seen in FIGS. 14A, 14B, the tongues (144) on the vanes (141) on the inner vane ring (91) are flanked by the female cavities (143) on the vanes (142) on the outer vane ring (90) such that the angular position of the vanes (141), about the axes (120), is controlled by the flank surfaces of the cavities in the vanes (142) on the outer vane ring (90). When there is relative motion (96 to 97) between the outer vane ring and the inner vane, the motion of one vane, relative to the other, causes the effective camber of the total vane to change As in the case of the previous embodiment, varying effective camber allows for better optimization of the inlet angle and throat area of a particular volute design, while exit angle and exit throat area can be adjusted independently for optimal turbine performance.

In an alternative embodiment, a section of vane from one vane ring, e.g., a fixed outer vane ring, can extend into the space of the other vane ring, e.g., the rotationally mounted inner vane ring. This alternative helps shape the "nozzle" formed between the two vane parts, giving the stream of exhaust gas greater directivity as the vanes move towards the "minimum open" position. Further, in the case that the rotation of one vane ring relative to the other vane ring is controlled using a rack-and-pinion or a stepper motor, etc, the return of the one vane ring against the "stop" provided by the other vane ring extending part results in a resetting of the vane ring to a "zero" position.

The vane rings may be rotated by any number of systems more simple than that used for typical VTGs. The vane rings may be actuated electrically, with electronic controls, or by pneumatic or hydraulic power, by worm gears or rack and pinions. The location of the vane rings can be in machined locations, which can be nitrided to provide both corrosion resistance and hardness, or by rollers and bearings. Inputs for the control system can be any turbocharger outputs.

Now that the invention has been described,

We claim:
1. A turbocharger, comprising:
a turbine wheel (70) rotatable about a central axis;
a housing (2) configured to enclose said turbine wheel and having a volute,
an inner ring of vanes (93) and an outer ring of vanes (92) provided between said volute and said turbine wheel,
wherein at least one of said inner ring of vanes and said outer ring of vanes is provided on a rotatable vane ring (90, 91), and
one of said inner and outer vanes are pivotably mounted, and wherein said inner and outer vanes are connected such that rotation of one vane ring relative to the other vane ring results in pivoting of said pivotably mounted vanes.

2. The turbocharger as in claim 1, wherein one of said outer vanes (92) and one of said inner vanes (93) when in registry form a general airfoil shape, with the outer vane forming the leading edge of said general airfoil shape, and said inner vane forming the trailing edge of said general airfoil shape.

3. The turbocharger as in claim 2, wherein said inner ring of vanes and outer ring of vanes are segregated along a circular boundary line.

4. The turbocharger as in claim 3, wherein said circular boundary line defines an arc through each of said general airfoil shapes separating each of said outer and inner vanes.

5. The turbocharger as in claim 1, wherein said inner ring of vanes and outer ring of vanes are segregated along a circular boundary line, and the area between outer vanes defines nozzles through which exhaust gas flows, and wherein a ratio of nozzle space at said circular boundary line to an area blocked by said outer vane at said circular boundary line is from 3:1 to 1:1.

6. The turbocharger as in claim 5, wherein said ratio is from 2:1 to 1:1.

7. The turbocharger as in claim 5, wherein said ratio is from 1.5:1 to 1:1.

8. The turbocharger as in claim 1, wherein said outer ring of vanes (92) is provided on said rotatable vane ring (90).

9. The turbocharger as in claim 1, wherein said inner ring of vanes (93) is provided on said rotatable vane ring (91).

10. The turbocharger as in claim 1, wherein said outer and inner ring of vanes (92, 93) are provided on rotatable vane rings (90, 91).

11. A turbocharger, comprising:
a turbine wheel (70) rotatable about a central axis;
a housing (2) configured to enclose said turbine wheel and having a volute,
an inner ring of vanes (93) and an outer ring of vanes (92) provided between said volute and said turbine wheel,
wherein at least one of said inner ring of vanes and said outer ring of vanes is provided on a rotatable vane ring (90, 91), and
said inner ring of vanes and outer ring of vanes are segregated along a circular boundary line, said outer vanes include a projection extending across said circular boundary line, whereby relative movement between inner and outer vanes causes said inner vane and said projection to form a nozzle with varying flow through area.

* * * * *